INVENTOR.
ELI A. KALLET
DANIEL F. STANFILL
BY Joseph Levinson
ATTORNEY

United States Patent Office 3,422,267
Patented Jan. 14, 1969

3,422,267
TWO-COLOR COMPENSATION MEANS FOR A RADIOMETRIC BALANCE SENSOR
Eli A. Kallet, Teaneck, N.J., and Daniel F. Stanfill III, Stamford, Conn., assignors to Barnes Engineering Company, Stamford, Conn., a corporation of Delaware
Filed July 29, 1965, Ser. No. 475,654
U.S. Cl. 250—83.3    2 Claims
Int. Cl. G01t 1/16; G01j 1/20; G02b 5/00

ABSTRACT OF THE DISCLOSURE

A balance type horizon sensor having at least one pair of radiation detectors having opposed fields of view which are connected in electrical opposition. Interfering radiation is projected on an opposed detector by sharing the system aperture with a small near-infrared lens which inverts the image of the interfering radiation when compared to the sensor's objective lens. Since the interfering radiation then appears on the opposed detectors, it is electrically cancelled.

---

Figure 1:
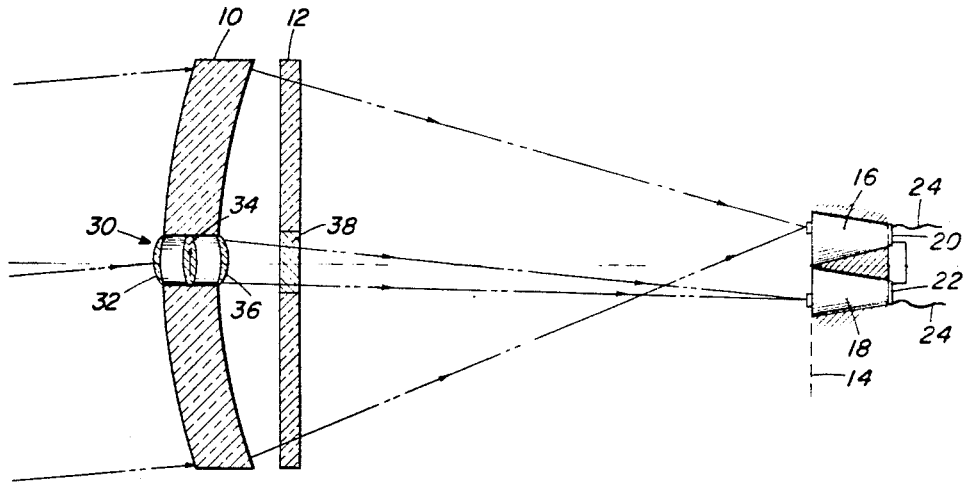

This invention relates to a radiation sensor operating on the principle of radiation balance of fields of view, and more particularly to a two-color compensation means for such sensors.

In utilizing radiometric sensors for tracking objects in the field of view of the sensor, providing positioning information, or measuring the radiation emanating from an object having an environment or surroundings, a problem usually presents itself of being able to distinguish the radiation to be measured from background, environmental, or interference-type radiation which does appear, or may likely appear in the field of view of the sensor. For example, in horizon sensors, space vehicles moving outside the earth's atmosphere have the problem of sensing the horizon and of producing an electrical signal which indicates the orientation of the vehicle with respect to the horizon. Since the infrared radiation is much greater from the warm earth than it is with respect to cold outer space, the sensor is able to detect the sharp line of discontinuity. However, if the sun or other hot object comes within the view of the sensor, the sun being much hotter and producing more radiation than the earth, errors are likely to occur.

Early type horizon sensors were generally of the scanning type in which optical scanning means were used to scan over the earth and outer space. As the scan of the sensor crosses the horizon, sharp changes of radiation take place, and with the utilization of reference signals within the sensor, the orientation of the vehicle can be determined. A more recent type of sensor has no moving parts, and operates on the principle of radiation balance. In such systems, more than one radiation detector is utilized, having different fields of view with the detectors connected in opposition, such that when an individual detector receives the same radiation from its field of view as does its opposite detector, a null condition exists. Output signals are then generated which are proportional to the displacement of the object being followed or tracked, such as the earth, from the previous null condition. Thus, displacement can be measured, depending on the ratio of areas of the fields of view of the individual detectors.

In either sensor system, interference such as would be caused by a hot object appearing in the sensor field of view, which would swamp out the desired signals, must be eliminated or compensated for in order for the system to operate properly. This can be accomplished by shutting down the system completely when radiation above a certain level is reached, as would occur with the presence of an object hotter than that to be measured appearing in the field of view of the sensor. This would not be desirable in the case of the balanced radiation type systems, in view of the possibility of losing the target altogether. Compensation could be provided in the radiation balance sensor by using separate detectors which indicate sun presence. In such a case, a fixed bias voltage could then be applied to cancel out the interference signal from the appropriate radiation detector. One of the drawbacks of such a system is that it is difficult to control the responsivity of a detector over a temperature range and over an elapsed time period. A further difficulty with biasing schemes is that normally full bias would be applied whether the interference caused, for example, by the sun was in full view of the radiation detector or merely on the rim of the field of view of the detector.

Accordingly, it is an object of this invention to provide a new and improved compensation means for radiometric balance type sensors.

It is a further object of this invention to provide a new two-color compensation means for a radiometric balance sensor which solves the problem of sun in the field of view of the sensor, and in a relatively simple manner compared to prior attempts to solve this problem.

In carrying out this invention, at least a pair of radiation detectors having opposed fields of view are spaced along the same axis and connected in electrical opposition. The technique employed by the present invention is to project the sun or interfering image in the opposite field to where the sun exists. This is achieved by sharing the aperture of the sensor with a small near-infrared lens system which inverts the image of the sun when compared to the infrared objective lens, covering the aperture. Thus, if the sun or interfering object is present in the field of view of a first detector, the smaller near-infrared systems inverts this interfering image and produces enough radiation on the second detector which essentially cancels out the signal produced by the emission of the sun or interfering object in the field of view of the first detector.

Figure 2:
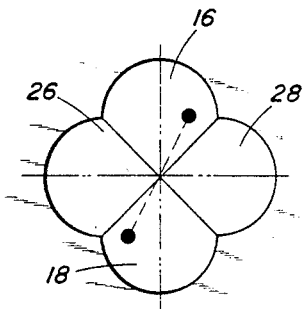

The invention, both as to organization and method of operation, together with further objects and advantages thereof, may best be understood by reference to the following description, taken in connection with the accompanying drawings, in which:

FIG. 1 is an optical schematic of the two-color compensation means for a radiometric balance sensor as embodied in this invention, in which the detectors of a single axis are shown, and FIG. 2 shows a two-axis system consisting of two opposed fields of view in each axis, which is suitable for use in the schematic shown in FIG. 1.

Since an important application of the present invention is the elimination of the sun-in-field effect in horizon sensors, the invention will be described with reference to such an application. However, the technique employed may be used for other applications where it is desirable to eliminate the effect of an unwanted object in the field of view of a radiometric balance type sensor.

The operation of a radiation balance type sensor will be described with reference to FIG. 1. The radiation balance sensor as shown in FIG. 1 includes an objective 10, an interference filter 12, a focal plane 14 for the objective 10, reflective cones 16 and 18, and radiation detectors 20 and 22. Reflective cones 16 and 18 are one form of a field lens pair. In principle these could also be refracting lenses. The type of radiation detectors which are utilized will depend on the particular application. For the illustrated application, thermopiles which have good response in the near and far infrared range are preferred. The interference filter 12 for purposes of disclosure is an optical filter with a 14-micron cut-on interference coating, but the invention is not considered limited to this particular spectral cut-on. Accordingly, the filter will pass the carbon-dioxide band which is particularly useful in horizon sensors, as this band is not greatly affected by cloud cover. The cones 16 and 18 are not truly cones, but somewhat pyramidal in shape. FIG. 2 shows this shape. Also included in FIG. 2 are cones 26 and 28, which would also be provided with detectors connected in a bucking arrangement to provide the system with a second axis. The view as shown in FIG. 2 is obtained by looking directly into the mouths of the cones, which would provide four fields of view, which are defined by the size and shape of the cone mouths and the focal length of the objective lens 10.

In operation, a desired earth target is imaged by the objective lens 10 through the interference filter 12, which cuts on at the specific wavelength, on the focal plane 14. The reflective cones 16 and 18 act as field lenses in the sense that they scramble the flux received from the earth target over the full face of the detectors 20 and 22. Assuming that the desired earth target is imaged off-axis so that it is located at the mouth of cone 16, all of the earth's energy would be received by detector 20. The detectors 20 and 22 are connected in opposition, and a difference signal would be available at the output leads 24 from the detectors 20 and 22. The difference signal could then be processed and used to drive a servo in a direction to null the signal. The electronic processing and servo mechanisms for achieving this function do not constitute a part of this invention, and therefore are not shown. When the earth is imaged with equal radiation being applied to detectors 20 and 22, a null occurs with detectors 20 and 22 producing equal and opposite signals. At this point no output signal is produced, and the system is tracking along one axis. The same principle may be applied for tracking along the axis of cones 26 and 28, as shown in FIG. 2. Thus, when equal radiation is applied from the target in the field of view of the sensor to radiation detectors along the same axis, the target is being tracked in that axis.

A problem arises with the radiation balance type sensor just described when an interference signal occurs in the field of view of the sensor. For example, if the sun appears in the field of view, as well as the earth which is desired to be tracked, in the region of 14 microns, which is selected in the present application, the ratio of sun radiation to earth radiation may be on the order of seven to one, 7:1. Since the sensor uses a radiation balance principle, a null will be reached at the combined center of radiation of the earth and sun, and would result in a large earth offset from center, and accordingly a large error. The present invention is directed to eliminating the effect of the interference radiation produced by the sun in the field of view of the sensor.

This is generally achieved by utilizing a two-color principle, which essentially projects the sun image in the opposite field to where the sun exists. Therefore energy of one band is utilized to cancel out a signal produced by the sun in a different band to provide the desired cancellation.

The desired cancellation, as illustrated in FIG. 1, is achieved by placing another optic 30 in a small hole drilled at the center of the objective lens 10. The optic 30 should, like optic 10, focus infinite objects at or close to the focal plane 14 of the objective 10. The optic 30 includes an inversion lens 32, a center or field lens 34, and a reverting lens 36. The interference filter 12 also has a small hole at its center in which is placed a filter 38 of a different spectral band pass. The center lens 34 is located at the first image plane of the lens 32, and acts as a field lens and does not affect the image. The image formed at the center lens 34 is reverted by the lens 36 and imaged again at the mouth of the cones 16 and 18. The interference filter 12 passes 14 microns and up, and the small filter 38 is chosen to pass a spectral region of 1.5 to 2.5 microns. Both the objective 10 and the small optic 30 may utilize silicon, which has good transmission above 1.2 microns, and therefore will pass the spectral bands chosen.

In operation it can be seen that if the sun appears in the field of view of the sensor, there will be two sun images focused at the focal plane 14 with one appearing at the mouth of cone 16 and the other appearing at the mouth of cone 18, as seen in FIG. 2. These sun images are diagonally opposite each other, and each is at the same radius from the center. Assuming the sun in the field of view of the sensor, it will be imaged on cone mount 16 and accordingly detector 20 will contain radiant energy above 14 microns. Since the sun is approximately a 5500° K. black body, more of its radiant energy occurs in the near infrared region. In order to generate the same radiant energy that the sun produces above 14 microns in the near infrared spectrum, a small aperture, as represented by the small optic 30, is utilized to form an image displaced 180° and at the mouth of cone 18. Since the response of thermopiles 20 and 22 are essentially equal in both the near infrared as well as the far infrared ranges which have been chosen, the near infrared emission projected to detector 22 essentially cancels the signal produced by the infrared emission of the sun on detector 20. As the sun is many times brighter than the earth albedo in the near infrared, the effect of the near infrared earth albedo on the system accuracy is negligible. The cancellation of the sun signal does not alter the operation of the system, as the infrared earth signal will allow the system to function as if there were no sun in the field of view of the sensor.

As an alternative to the small optic 30, a small erecting and reverting prism arrangement may be utilized at the center of the objective 10, either ahead of or behind the objective 10. The invention has been described in connection with the elimination of interference signals caused by the sun in the field of view of a horizon sensor. However, the two-color scheme of compensation for a balance type sensor may be utilized where the type of interference signal readily lends itself to the two-color compensation technique.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. A radiation balance type sensor comprising:
    (a) at least a pair of radiation detectors spaced along the same axis having opposed fields of view along said axis and being connected in electrical opposition,
    (b) objective means for imaging a target and any undesired target in the field of view of the sensor on said opposed fields of view of said detectors whereby a null is produced when radiation from said target is imaged equally on said detectors and an output occurs when said target applies more radiation to one detector than the other, (c) optical means positioned in a central opening in said objective means for inverting and reverting the image of said undesired target, and (d) an interference filter having a first portion for passing predetermined wavelengths of radiation and having a central portion for passing different predetermined wavelengths of radiation positioned between said objective and optical means and said detectors such that radiation collected by said objective lens is imaged on said detectors through said first portion of said interference filter and radiation from said optical means is imaged on said detectors through said central portion of said interference filter.

2. The structure set forth in claim 1 wherein said optical means comprises an inverting lens, a field lens, and a reverting lens.

References Cited
UNITED STATES PATENTS 3,020,407   2/1962   Merlin _____ 250—83.3
3,204,100   8/1965   Wormser et al. _____ 250—83.3

JAMES W. LAWRENCE, *Primary Examiner.*

W. J. SCHWARTZ, *Assistant Examiner.*

U.S. Cl. X.R.

250—203; 88—1; 73—355